April 9, 1940.  W. A. BONE ET AL  2,196,188

PROCESS OF PRODUCING FORMALDEHYDE

Filed Dec. 23, 1936

INVENTORS.
WILLIAM ARTHUR BONE
DUDLEY MAURICE NEWITT
BY
ATTORNEY.

Patented Apr. 9, 1940

2,196,188

UNITED STATES PATENT OFFICE 2,196,188

PROCESS OF PRODUCING FORMALDEHYDE

William Arthur Bone and Dudley Maurice Newitt, South Kensington, London, England, assignors to Imperial Chemical Industries Limited, a corporation of Great Britain Application December 23, 1936, Serial No. 117,416
In Great Britain December 24, 1935

1 Claim. (Cl. 260—604)

This invention relates to a method for effecting the partial oxidation of gaseous hydrocarbons, especially methane, to produce aldehydes and alcohols.

Chemical reactions involving gaseous materials which are dependent upon the presence of solid catalysts or of extended solid surfaces are frequently accompanied by side reactions or consecutive reactions as the result of which undesirable by-products are obtained. When dealing with such gaseous reactions it is important therefore to arrange that the reaction products shall be removed from the reaction zone as quickly as possible in order to limit or prevent the formation of undesirable by-products.

It is an object of the present invention to provide a method for carrying out gaseous chemical reactions, in particular, gaseous reactions which are dependent upon the presence of solid catalysts or extended solid surfaces, whereby the reaction products are rapidly removed from the zone of reaction. A still further object is to provide a novel method for effecting the partial oxidation of gaseous hydrocarbons to produce aldehydes and alcohols and especially for the oxidation of methane to produce formaldehyde or methanol. These and other objects will be apparent from the ensuing description of the invention.

Figure 1:
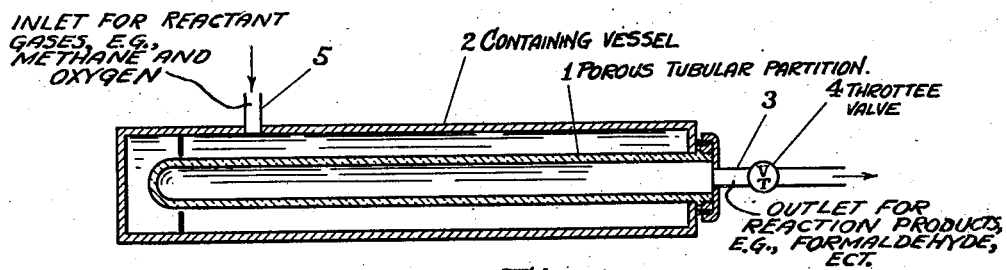
Figure 2:
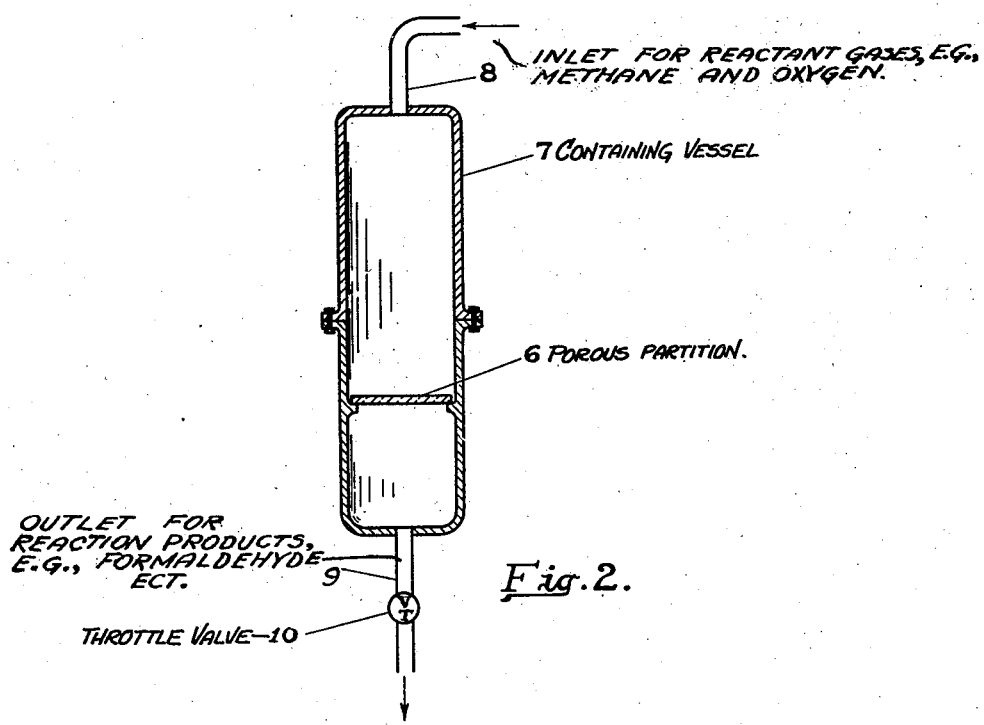

Figure 1 is a longitudinal cross-section view of one embodiment of our invention and Figure 2 is a longitudinal cross-section view of another embodiment thereof. The types of apparatus illustrated by Figures 1 and 2 may be advantageously employed in practicing our improved method for carrying out gaseous reactions.

The above objects may be accomplished in accordance with the present invention by causing the reaction gases to flow through a porous partition made of unglazed porcelain, earthenware or other porous material offering an appreciable resistance to the passage of the gases. The degree of porosity of the partition, the surface/volume ratio and the thickness of the partition, may be chosen so that the gases have reacted to the desired extent by the time they reach the low pressure side of the partition whence they are rapidly removed and cooled or otherwise treated to isolate the reaction products.

The porous partition is maintained at a suitable temperature favorable to the reaction in question, for example, by radiation from the walls of a surrounding chamber or by means of electrical resistances embedded in the partition.

The partition may take the form of a screen occupying part or the whole of the cross-section of the gas conduit, but preferably we use a porous tubular vessel closed at one end and mounted near the other end in the wall of a containing vessel, the arrangement being such that the reaction gas is compelled to traverse the wall of the tube and is then rapidly withdrawn. Thus the initial gas mixture may be admitted to the containing vessel and a gas discharge pipe provided communicating with the interior of the porous tube together with a throttle valve for adjusting the pressure within the tube and consequently the rate of flow of the gases through the walls of the tube. It is also possible to admit the gas to the porous tube and to withdraw it from the containing vessel.

The present invention may be better understood by reference to the accompanying drawing which illustrates two types of apparatus that may be advantageously employed in practicing the present invention.

Figure I shows a longitudinal cross-section view of an apparatus consisting of a porous tubular vessel 1 which is closed at one end and is mounted near the other or open end in the wall of a containing vessel 2. The open end of vessel 1 communicates by means of conduit 3 through the throttle valve 4 to a scrubbing or other system not shown for recovering or otherwise treating the reaction products. The containing vessel 2 is provided with an inlet conduit 5 for supplying the reacting gases. Heat may be supplied to the system by any convenient means not shown, for example, by externally heating the walls of vessel 2 or, if desired, the walls of the porous vessel 1 may be provided with electrical resistance wires embedded in the porcelain, or other porous material, for heating the walls to the desired temperature. The closed end of vessel 1 may be supported, if desired, as indicated in the drawing, within containing vessel 2. The arrows in the figure indicate the path taken by the gaseous materials as they pass through the apparatus. If desired, the direction of flow may be reversed.

Figure II shows a longitudinal cross-section view of an apparatus having a porous partition 6 positioned within a tubular vessel 7 at right angles to the axis of the tubular vessel. Vessel 7 is provided on one side of the partition with an inlet conduit 8 for delivery of reactant gases and on the other side with an exit conduit 9 for conducting the reaction by-products to any suitable scrubbing or recovery system not shown. A throttle valve 10 is inserted in conduit 9 for adjusting the pressure on the discharge side of the partition 5. Heat may be applied to the system by externally heating vessel 7 or by embedding electrical resistances within the partition 6.

Instead of making the porous partition of unglazed porcelain, earthenware or the like, it may be made of metal gauze or of sintered metal, glaze or silica. It may also be made of a material which is a catalyst for the reaction in question, or such material may be deposited or incorporated in the material of the partition. In some cases it may be desirable to arrange to cool the low pressure side of the partition, for example, by cooling coils or by admitting cold gases.

Any suitable pressure may be used in carrying out gas reactions with the aid of porous partitions of the kind described, as the latter are only required to withstand the difference in pressure required to give rise to the desired rate of flow of the gases through the partition. Such rate or flow is conveniently regulated by regulating the pressure on the discharge side of the partition by means of a throttle valve as illustrated in the accompanying drawing.

Our invention may be illustrated by the following example.

Example 1

A porous tube was constructed of a copper gauze support on which was built a layer $\frac{1}{16}$ inch thick of a catalyst consisting of basic zinc chromate prepared according to the method described in the Proceedings of the Royal Society A vol. 123 (1929), p. 242. The tube was inserted in a steel reaction vessel which was electrically heated to 320° C. and water gas at 100 atmospheres pressure was passed into the reaction vessel. The uncombined gases and products were withdrawn at such a rate that the time of contact with the catalyst was about 20 seconds. The yield of methyl alcohol was 80% of the maximum based upon equilibrium measurements. With a similar weight of catalyst distributed about the reaction vessel it required a time of approximately ten minutes to obtain the same yield.

We have found that by our method methane can be partially oxidized to formaldehyde by means of gaseous oxygen, either as such or in the form of air, at temperatures of 400 to 600° C., preferably 450 to 550° C., and at a pressure ranging from atmospheric pressure up to, but not exceeding, 20 atmospheres. At higher pressures and lower temperatures the formation of methyl alcohol is favored.

For formaldehyde production, the methane and oxygen in the reaction mixture are adjusted in about equimolecular proportions, while for methanol production the ratio of methane to oxygen should be increased. Reaction mixtures in both cases contain sufficient methane to render them non-explosive.

The partial oxidation of methane in our process occurs freely, after the usual short inhibition period, without the aid of catalysts, although if desired, oxidation catalysts may be employed. A high ratio of surface to volume in the reaction space is desirable for bringing about a rapid reaction and this may be achieved by passing the reaction mixture through a vessel containing a porous partition as described above and as illustrated by the accompanying drawing. A high space velocity should also be used to ensure that the resultants are quickly removed from the reaction zone, i. e., the solid surfaces and their immediate neighborhood, as quickly as possible.

By using gas mixtures containing a limited amount of oxygen, it is possible to arrange that practically all the oxygen is used up in the short time available for the reaction, and consequently after the condensible reaction products have been removed from the gases, for example, by cooling, the residual gas consists mainly of unused hydrocarbon together with any inert gases, such as nitrogen, that were originally present, and some oxides of carbon formed as by-products. If the proportion of unused hydrocarbon is sufficiently high, the residual gas, or a portion thereof, may be returned to the process together with suitable amounts of make-up hydrocarbon and oxygen or oxygen-containing gases.

Ethane and ethylene behave in a similar manner to methane when submitted to partial oxidation under the conditions described above, although the reaction products are more varied.

The preparation of partial oxidation products of hydrocarbons is illustrated by the following examples.

Example 2

A mixture of 16% methane and 84% of air was passed under a pressure of 5 atmospheres into a reaction chamber heated to 535° C. The apparatus employed was essentially the same as that illustrated by Figure I, the porous tube being constructed of unglazed porcelain. The reactant gases were compelled to pass through the walls of the porcelain tube by maintaining a low pressure on the inside of the tube by means of a throttle valve on the gas discharge pipe. The gases emerging from the unglazed porcelain tube were scrubbed with water to absorb formaldehyde. The yield of formaldehyde obtained was 25% of the methane oxidized. Good yields of formaldehyde were also obtained when working at pressures of 10 atmospheres.

Example 3

A mixture of 90% of methane and 10% air was passed under a pressure of 100 atmospheres through a reaction chamber of the kind used in Example 2, the temperature being maintained at 300 to 400° C. The reaction gases were cooled to condense methyl alcohol.

It will be seen that the present method and apparatus enable the products from surface and/or catalytic gas reactions to be removed rapidly from contact with the surface or catalyst whereby secondary reactions are minimized or eliminated, while enhanced yields of the desired products are obtained. Moreover, intimate contact between the surface or catalyst and the reaction gases is insured so that yields are greatly increased.

We claim:

The process which comprises compelling a gaseous mixture containing approximately equimolecular quantities of methane and oxygen to pass through a porous partition of unglazed porcelain at a pressure of 1 to 20 atmospheres and at a temperature of 400–600° C., rapidly withdrawing reaction products as they emerge from said porous partition and separating formaldehyde therefrom.

WILLIAM ARTHUR BONE.
DUDLEY MAURICE NEWITT.